United States Patent
Erimli et al.

(10) Patent No.: US 6,618,390 B1
(45) Date of Patent: Sep. 9, 2003

(54) METHOD AND APPARATUS FOR MAINTAINING RANDOMLY ACCESSIBLE FREE BUFFER INFORMATION FOR A NETWORK SWITCH

(75) Inventors: Bahadir Erimli, Campbell, CA (US); Vallath Nandakumar, Campbell, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/316,084

(22) Filed: May 21, 1999

(51) Int. Cl.[7] .............................................. H04L 12/28
(52) U.S. Cl. ..................... 370/412; 370/413; 370/414; 370/415; 370/395.7; 370/395.71; 370/395.72; 710/52; 710/56; 711/104; 711/105; 711/149; 711/170
(58) Field of Search ................................. 711/104, 105, 711/149, 154, 163, 170; 710/52, 53, 33, 56, 57, 316, 113, 114, 240–243; 370/389, 412–417, 395.7, 395.71, 395.72

(56) References Cited

U.S. PATENT DOCUMENTS

| | | | | |
|---|---|---|---|---|
| 5,432,908 A | * | 7/1995 | Heddes et al. | 711/147 |
| 5,515,376 A | | 5/1996 | Murthy et al. | |
| 5,812,559 A | * | 9/1998 | Nakaide et al. | 714/719 |
| 6,032,179 A | * | 2/2000 | Osborne | 709/213 |
| 6,041,397 A | * | 3/2000 | Rickard et al. | 711/209 |
| 6,088,745 A | * | 7/2000 | Bertagna et al. | 710/56 |
| 6,092,172 A | * | 7/2000 | Nishimoto et al. | 711/207 |
| 6,108,692 A | * | 8/2000 | Van Seters et al. | 709/213 |
| 6,125,072 A | * | 9/2000 | Wu | 365/230.03 |
| 6,175,902 B1 | * | 1/2001 | Runaldue et al. | 711/159 |
| 6,192,028 B1 | * | 2/2001 | Simmons et al. | 370/229 |
| 6,263,410 B1 | * | 7/2001 | Kao et al. | 711/156 |
| 6,269,098 B1 | * | 7/2001 | Crayford | 370/389 |
| 6,289,421 B1 | * | 9/2001 | Ali et al. | 711/149 |
| 6,301,264 B1 | * | 10/2001 | Holm | 370/465 |
| 6,424,658 B1 | * | 7/2002 | Mathur | 370/429 |
| 2001/0010692 A1 | * | 8/2001 | Sindhu et al. | 370/395 |
| 2001/0054121 A1 | * | 12/2001 | Proch et al. | 710/57 |

* cited by examiner

*Primary Examiner*—Kenneth Vanderpuye
*Assistant Examiner*—Van Kim T. Nguyen

(57) ABSTRACT

An apparatus and method are disclosed for maintaining free buffer information for a network switch. A first Random Access Memory (RAM), located on the network switch, functions to store values that indicate whether or not free buffers, located in a second RAM, are available for storing received data frames. An input logic is provided for placing values in the first RAM to indicate which free buffers are available for storing the data frames. When free buffers are required to store data frames, the output logic searches the first RAM and locates values that indicate available free buffers in the second RAM. The output logic then generates buffer pointers that address the locations of the free buffers in the second RAM. The buffer pointers that are generated are stored in a small capacity queue on the network switch to provide immediate availability to free buffers.

20 Claims, 8 Drawing Sheets

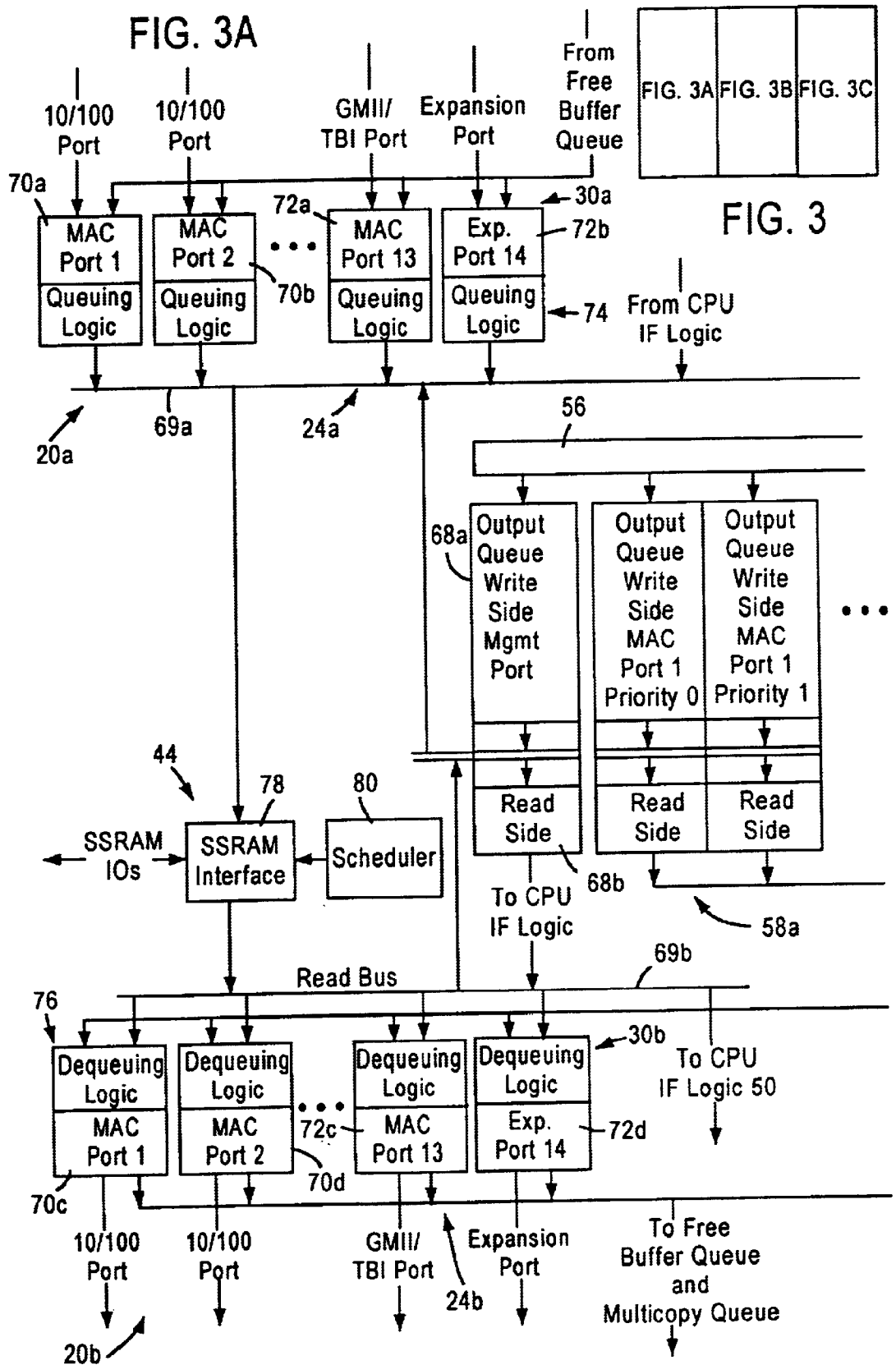

METHOD AND APPARATUS FOR MAINTAINING RANDOMLY ACCESSIBLE FREE BUFFER INFORMATION FOR A NETWORK SWITCH

BACKGROUND OF THE INVENTION

1. Field of the Invention

The present invention relates to communication systems, and more particularly, to a method and apparatus for maintaining free buffer information.

2. Description of the Related Art

Modern communication systems, such as computer networking systems or communication networks, provide constant transmission of data between end stations and/or intermediate stations such as routers and signal amplifiers. Computer networking systems, such as packet switched networks (e.g., Ethernet networks), often require transmission of data to a single end station or to multiple end stations within the network. The data originates from a user program, and is segmented into multiple data frames and subsequently transmitted in order to simplify processing and minimize the retransmission time required for error recovery. For example, in a conventional e-mail system, a user may desire to send the same e-mail message to four different users that are connected to the e-mail system. Accordingly, the identical data would be directed to multiple end stations.

Packet switched computer networks typically employ a network switch that receives and forwards data frames to individual and/or multiple end stations. The switch makes forwarding decisions upon receipt of data frames based on information contained in a header of each data frame. For example, if a received data frame is to be transmitted to a number of end stations, the switch must make the forwarding decision to forward the data frame to the ports of the correct end stations.

Data frames must comply with certain transmission standards that allow transparent interpretation by various networks such as, for example, the Ethernet (IEEE 802.3) network. The network standard outlines the parameters and requirements (e.g., media type, data structures, etc.) that must be used to ensure a level of reliability and quality of service. During normal operation, a large quantity of data must be exchanged though a network. When data is received by a network switch, it is forwarded to a network station specified by a header contained in the data frame.

Depending on the specific implementation and/or characteristic of the networking system (i.e., data transfer rate, traffic intensity), buffers must normally be provided for temporary storage of the data frames received by the switch, until forwarding decisions can be made. Without the use of buffers, there is a great likelihood that data frames will be lost, hence requiring retransmission and reducing the overall efficiency of the system.

The buffers used by the switch to store the data frames are usually accessed using pointers that address the location of specific buffers in a storage location such as a Random Access Memory (RAM) located external of the network switch. The switch then stores the pointers in a queue structure that can be accessed anytime a data frame must be stored in memory. One method of accessing the buffers in the external memory requires that the pointers be decodable into unique address locations for corresponding buffers. For example, each pointer can be divided into two portions that address specific locations in the external memory where the buffer is located.

When data frames arrive at a network switch, only buffers that are currently available (i.e., "free") may be used to store the data frames, in order to prevent overwriting of a first data frame by a second data frame prior to transmission. Once the data frames have been transmitted, or are otherwise determined to be no longer necessary, the buffers storing the data frames may be reused to store newly received data frames. In addition, it is possible for buffers to be set aside for storing incoming data frames, but because of error checking or an insufficient amount of data received, the data frames must be discarded. It is therefore imperative that sufficient buffer pointers are available to address buffers for storing received data frames.

The queues used to store buffer pointers are typically maintained on the chip itself (i.e., referring to the chip on which the switch is implemented) in order to minimize latency. The expense associated with on-chip real estate may be addressed by providing a storage area external of the chip (i.e., external memory). An external storage area, however, introduces new problems because access to the "on-chip" memory may be considerably faster than access to the external memory. Consequently, latency may be significantly increased when information must be stored in, or retrieved from, an external memory. Furthermore, providing an external storage area requires complex logic to provide high-priority access to the external memory, and increases the bandwidth for accessing the external memory from the chip.

Accordingly, a problem associated with communication systems, such as computer networks, is the amount of on-chip real estate required on a network switch to maintain an adequate quantity of buffer pointers for addressing buffers that are available to store received data frames. Another problem associated with such communication systems is the complexity of the logic that must be incorporated to provide priority access to the external memory when there is insufficient on-chip storage. Still another problem is the increased latency and bandwidth that results when access to the external memory is required.

DISCLOSURE OF THE INVENTION

There exists a need for an arrangement that is capable of efficiently maintaining information for accessing buffers to store data frames within a communication system such as a computer network.

These and other needs are addressed by the present invention wherein a random access memory is provided on the network switch for storing values that indicate the available buffers for storing received data frames.

In accordance with one aspect of the present invention, an arrangement is provided for maintaining free buffer information for a network switch. The arrangement includes a first random access memory (RAM), an input logic, and an output logic. The first RAM is located on the network switch and functions to store values that indicate whether or not free buffers, located in a second RAM, are available for storing received data frames. The input logic places values in the first RAM to indicate which free buffers are available for storing the data frames. The output logic searches the first RAM and locates values that indicate available free buffers in the second RAM. The output logic then generates buffer pointers that address the locations of the free buffers in the second RAM. The present arrangement advantageously reduces the amount of storage space required to store buffer pointers by utilizing a RAM that stores only an indication of whether free buffers are available for use. Buffer pointers are then created only when necessary to address buffers for storing data frames. Hence, the overall amount of storage space required to maintain free buffer information on the switch is reduced. Furthermore, latency is reduced because a prescribed number of buffer pointers can be stored on the switch, rather than providing a large capacity storage area located in an external memory.

According to another aspect of the invention, a method of maintaining free buffer information for a network switch comprises the steps: placing values, in a first RAM located on the network switch, that indicate the availability of free buffers located in a second RAM, the free buffers being usable by the network switch to store received data frames; searching the first RAM to locate values that indicate available free buffers in the second RAM; and generating buffer pointers that address the locations of the free buffers in the second RAM, the buffer pointers being available for use by the network switch to locate free buffers for storing received data frames. The present method advantageously reduces latency by storing values that indicate availability of free buffers and generating buffer pointers when necessary, rather than providing a large capacity storage area located in external memory for storing buffer pointers. Additionally, the present method reduces the amount of bandwidth between the network switch and the external memory, because the buffer pointers are maintained on the network switch. Hence, overall operations between the network switch and the external memory are improved.

Additional advantages and novel features of the present invention will be set forth in part in the description which follows, and in part will become apparent to those skilled in the art upon examination of the following, or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

DETAILED DESCRIPTION OF ILLUSTRATIVE EMBODIMENTS

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
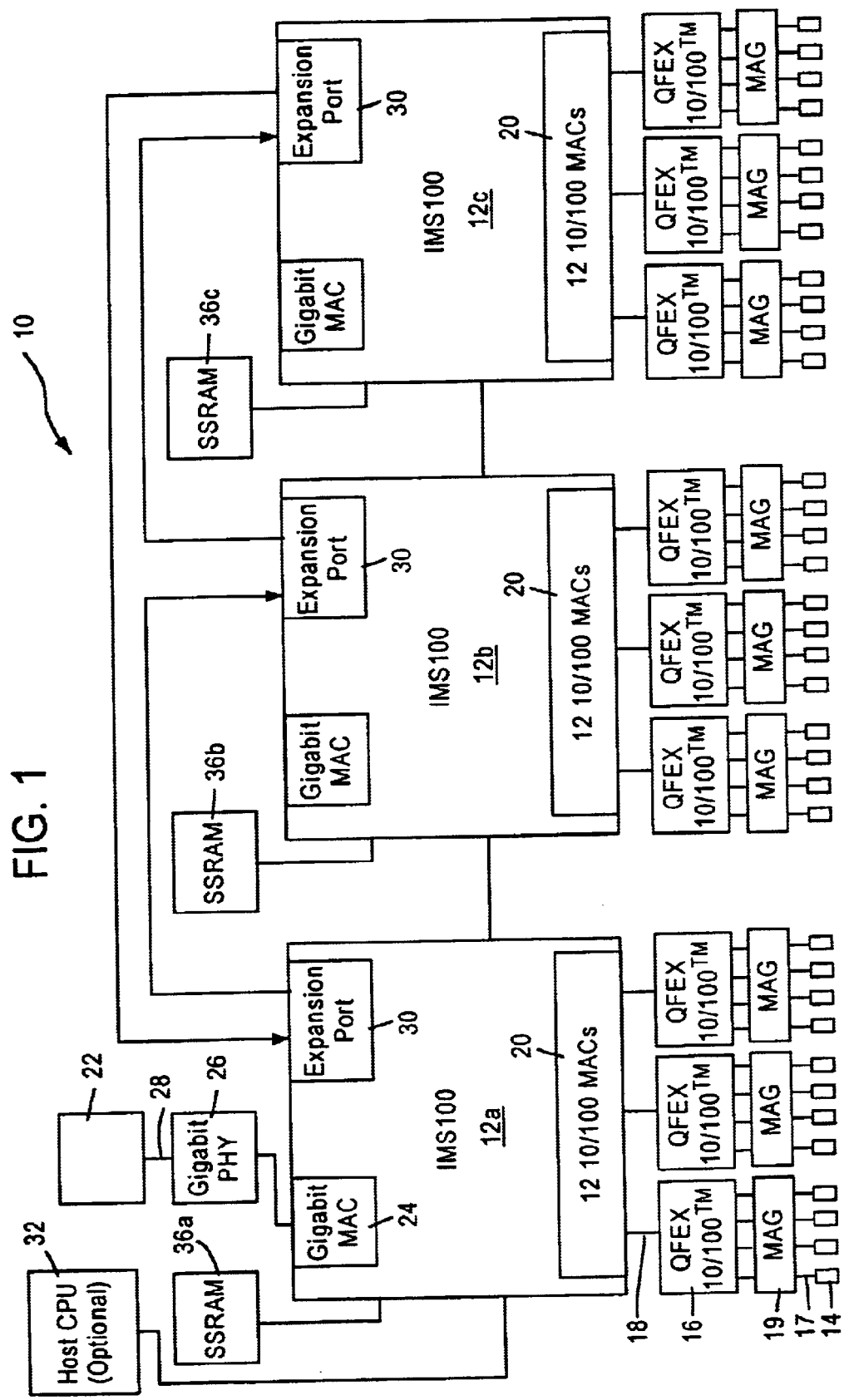
FIG. 1 is a block diagram of a packet switched network including a multiple port switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective shared media independent interfaces (MII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished or prioritized over the medium 17. Rather, each, half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding shared media independent interface (MII) 18. In particular, each 10/100 PHY transceiver 16 is configured for sending and receiving data packets between the multiport switch 12 and up to four (4) network stations 14 via the shared MII 18. A magnetic transformer 19 provides AC coupling between the PHY transceiver 16 and the corresponding network medium 17. Hence, the shared MII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. For example, each expansion port 30 can be implemented as a second gigabit MAC port similar to port 24, thereby enabling multiple multiport switches 12 to be cascaded together as a separate backbone network.

Figure 2:
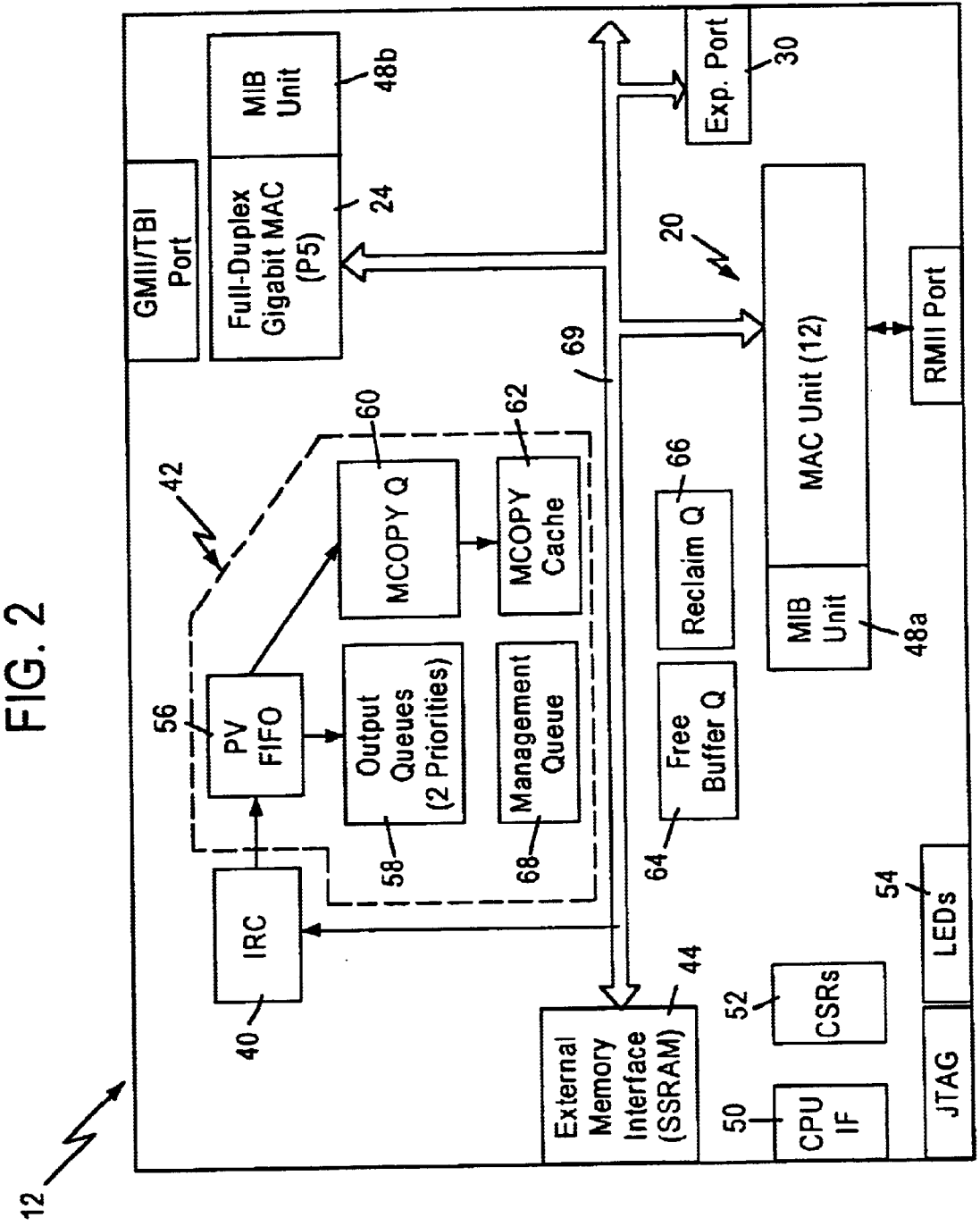
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring data frames according to the frame forwarding decisions, an external memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and the gigabit node 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the external memory 36 for storage of received data frames, memory structures, and MIB counter information. The external memory 36 is preferably either a Joint Electron Device Engineering Council (JEDEC) pipelined burst or Zero Bus Turnaround™ (ZBT)SSRAM having a 64-bit wide data path and a 17-bit wide address path. The external memory 36 is addressable as upper and lower banks of 128K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received from one source to at least one destination station.

The multiport switch 12 also includes an LED interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the frame pointer value and the associated header information to determine which MAC ports will output the data frame stored at the location specified by the frame pointer. The decision making engine (i.e., the IRC 40) may thus determine that a given data frame should be output by either a single port, multiple ports, or all ports (i.e., broadcast). For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. Alternatively, the received data frame may include a VLAN (virtual LAN) tagged frame according to IEEE 802.1d protocol that specifies another network (e.g., via a gateway such as the gigabit mode 22) or a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should receive the data frame, Rx port number, an untagged set field, VLAN information, opcode, and frame pointer. The port vector identifies the MAC ports to receive the data frame for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 fetch the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are fetched from the respective output queues 58, ensuring that the data frame is not overwritten in the external memory 36 until the appropriate number of copies of the data frame have been output from the external memory 36. Once the number of copies output corresponds to the number of ports specified in the port vector FIFO 56, the frame pointer is forwarded to the reclaim queue 66. The reclaim queue 66 stores frame pointers that can be reclaimed and later input to the free buffer queue 64 as free pointers. After being input to the free buffer queue 64, the frame pointer is available for reuse by the MAC unit 20 or the gigabit MAC unit 24. The manner in which entries such as frame pointers are input to the free buffer queue 64 will be described in greater detail below.

Figure 3B:
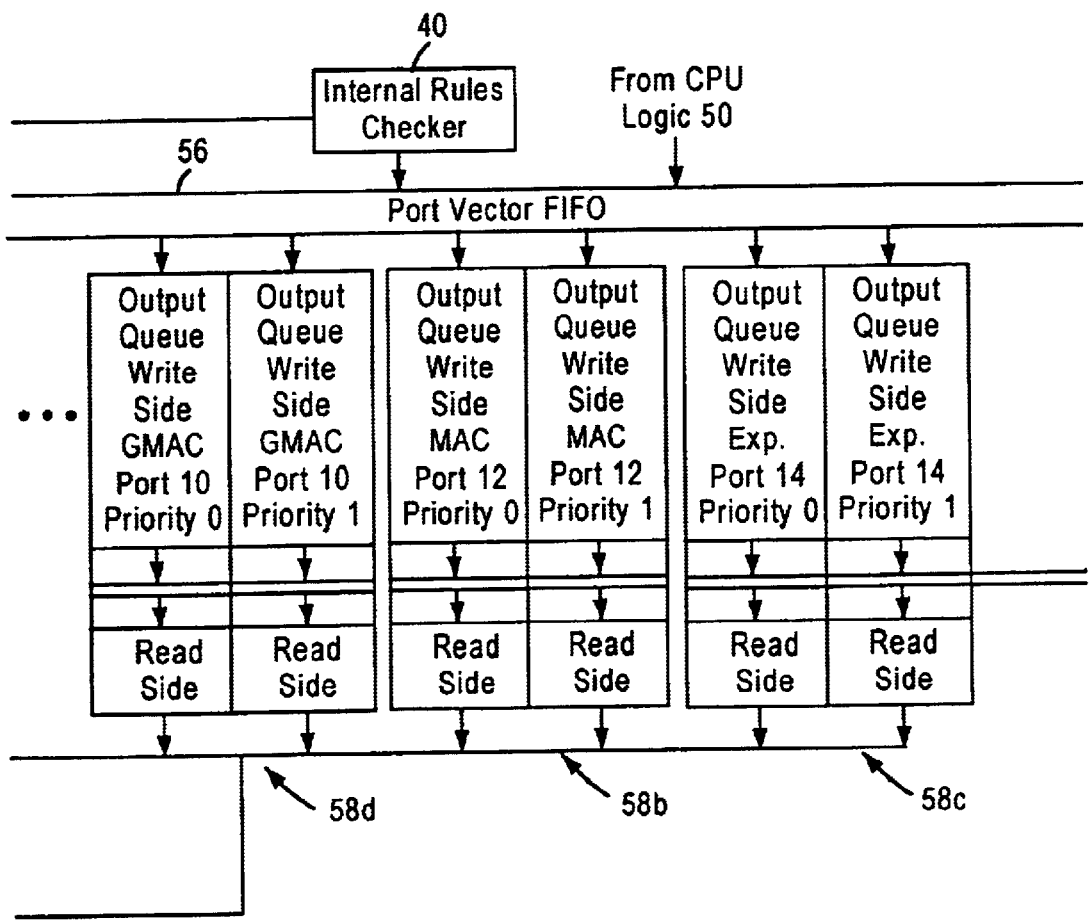
FIG. 3 is a block diagram illustrating in detail the switching subsystem of FIG. 2.
Figure 3C:
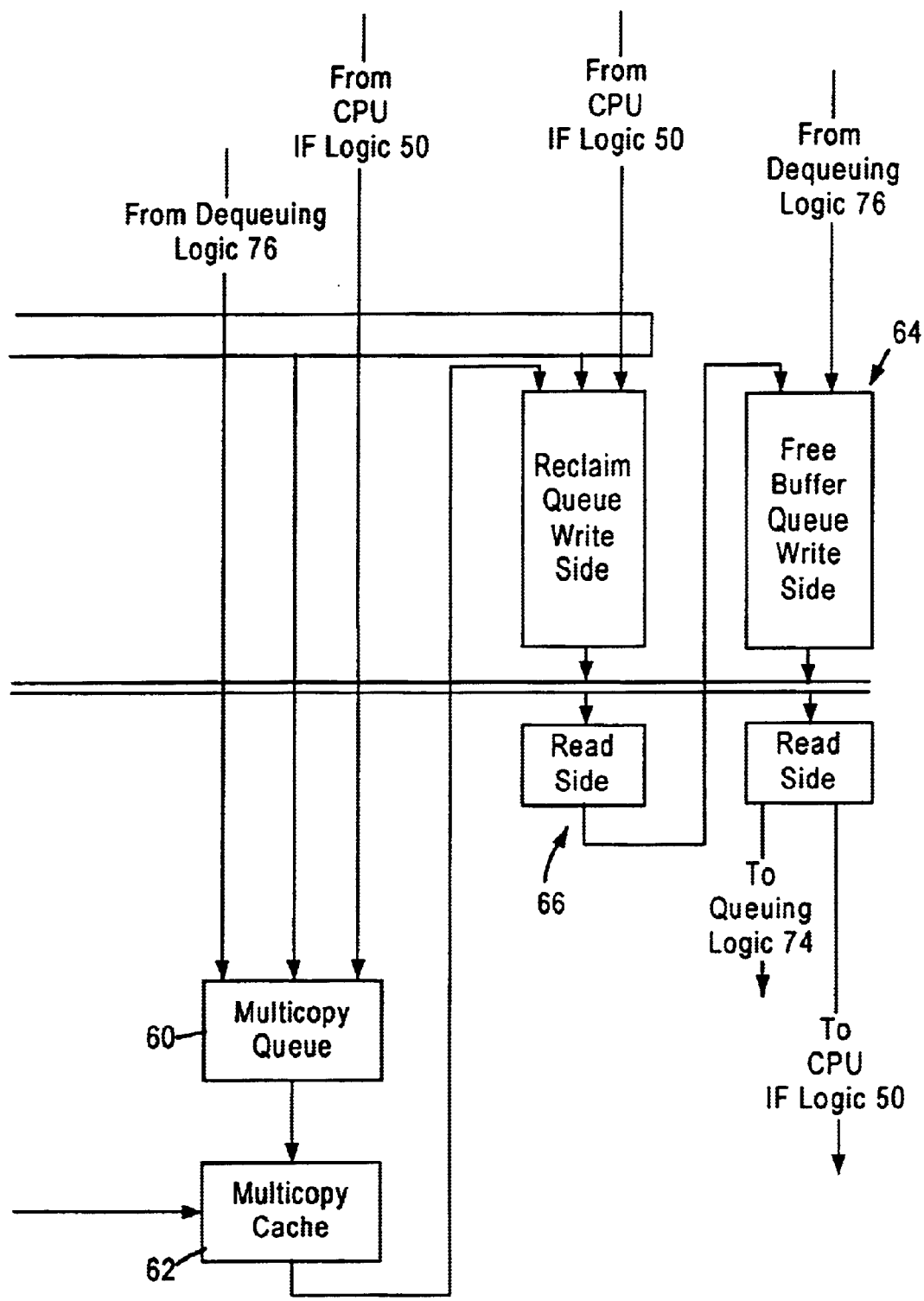

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 20b. The receive portion 20a and the transmit portion 20b each include twelve (12) MAC modules (only two of each shown and referenced by numerals 70a, 70b, 70c, and 70d) configured for performing the corresponding receive or transmit function for four (4) switch ports according to IEEE 802.3 protocol. Hence, the MAC modules 70c and 70d perform transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a data frame in an internal FIFO upon reception from the corresponding switch port. The size of the FIFO is sufficient to store the data frames that arrive between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of the data frame is then transferred over a write data bus 69a from the receive FIFO to the external memory 36 in a direct memory access (DMA) transaction during the assigned slot based on the retrieved frame pointer. The data frame is stored in the location pointed to by the free buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue, e.g. at least one of the output queues 58 or the management queue 68, should receive the associated frame pointer. The port vector FIFO 56 places the frame pointer into the top of the appropriate queue 58 and/or 68. This queues the transmission of the frame. Each output queue 58 is processed separately by the host CPU 32 via the CPU interface 50.

As shown in FIG. 3, each of the transmit MAC units 70c, 70d, 72d, and 72c has an associated output queue 58a, 58b, 58c, and 58d, respectively. Although not shown in FIG. 3, in preferred embodiments, each of the output queues 58 has a high priority queue for high priority frame pointers, and a low priority queue for low priority frame pointers. The high priority frame pointers are used for data frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58d for the gigabit transmit MAC 72c. The dequeuing logic 76 for the transmit gigabit port 24b takes the frame pointer from the corresponding gigabit port output queue 58d, and issues a request to the scheduler 80 to read the data frame from the external memory 36 at the memory location specified by the frame pointer. The scheduler 80 schedules the request, and issues a grant for the dequeuing logic 76 of the transmit gigabit port 24b to initiate a DMA read during the assigned slot. In response to the grant, the dequeuing logic 76 reads the data frame (along the read bus 69b) in a DMA transaction from the location in external memory 36 pointed to by the frame pointer, and stores the data frame in the internal transmit FIFO for transmission by the transmit gigabit MAC 72c. If the frame pointer specifies a unicopy transmission, the frame pointer is returned to the entity responsible for placing buffer pointers into the free buffer queue 64 following writing the data frame into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the entity responsible for placing buffer pointers into the free buffer queue 64 after the buffer contents have been copied to the appropriate transmit FIFO. For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the data frame for a particular output port based on a fetched frame pointer and stores the data frame in the transmit FIFO, the dequeuing logic 76 checks if the unicopy bit is set to 1. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the to the entity that will place buffer pointers into the free buffer queue 64.

The foregoing description of the switch architecture provides an overview of the switch operations in a packet switched network. A more detailed description of the features of the present invention as embodied in the multiport switch 12 will now be provided. First, the structure of frame buffers used to store received data frames will be described, followed by the description of an exemplary arrangement for maintaining free buffer information on the multiport switch 12.

Buffer Structure

Figure 4A:
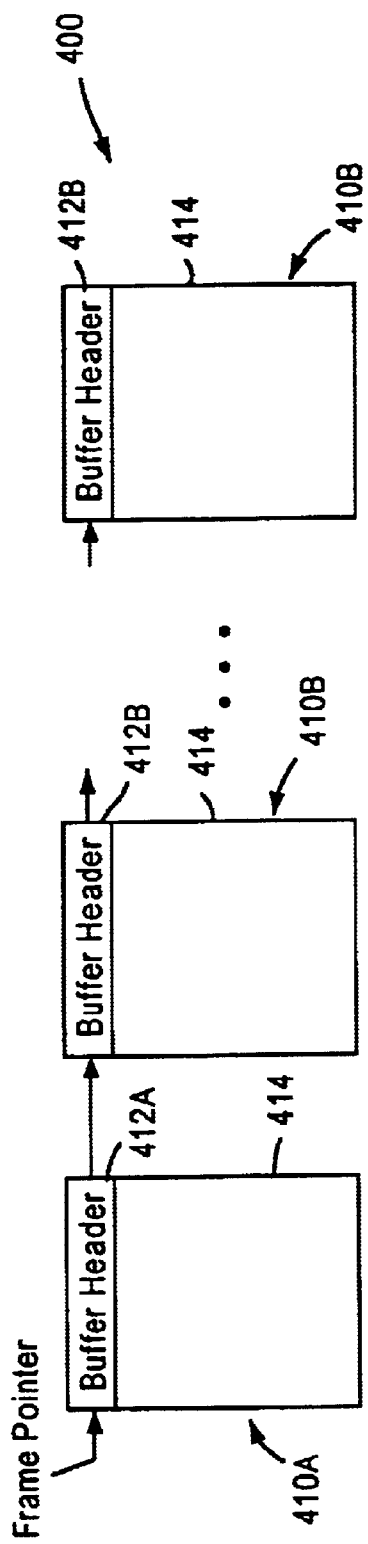
FIG. 4A illustrates a linked list data structure used to store received data frames in the external memory, according to an exemplary embodiment of the present invention.

FIG. 4A illustrates a linked list data structure 400 used to store received data frames in the external memory 36, according to an exemplary embodiment of the present invention. The linked list data structure 400 includes multiple frame buffers 410 that are linked together in order to receive various-sized data frames. The frame buffers 410 used to create the linked list 400 illustrated in FIG. 4A are 256 bytes in length, although depending on the specific implementation of the present invention, buffer lengths of different sizes may be used.

As illustrated in FIG. 4A, there are two different types of frame buffers, namely a "first" frame buffer 410A and a "subsequent" frame buffer 410B. As suggested, the first frame buffer 410A is first in the linked list data structure 400. The subsequent frame buffers 410B correspond to all other frame buffers in the linked list data structure 400. Regardless of type, each frame buffer 410 (first or subsequent) includes a header portion 412 (e.g., buffer header) and a data portion 414. The buffer header 412 is 16 bytes in length, while the data portion 414 is 240 bytes in length. The buffer header 412 of each frame buffer 410 includes information, such as a pointer, that addresses a location in the external memory 36 where the frame buffer 410 is located. Hence, the linked list data structure is composed of plural frame buffers 410 linked together by address pointers, stored in each buffer header 412, that indicate the location of the next frame buffer 412 in the external memory 36. According to the exemplary embodiment illustrated in FIG. 4A, the pointer used to address the first frame buffer is called a frame pointer. This is the identical frame pointer that is used to identify data frames by the IRC 40, control queues, and output queues.

Figure 4B:
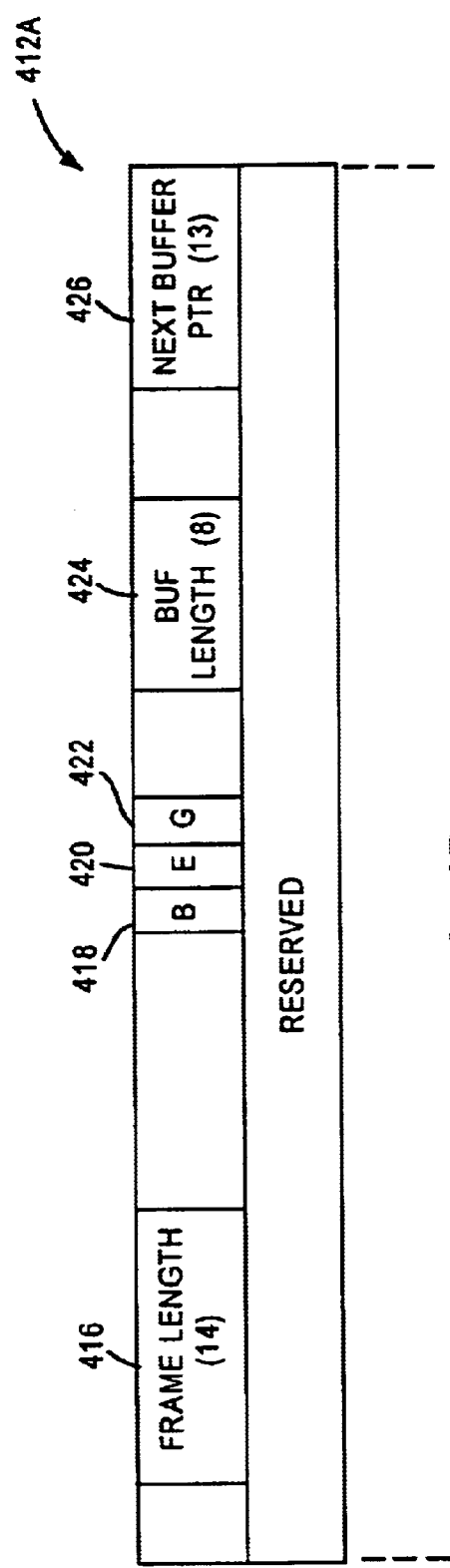
FIG. 4B is a block diagram illustrating the format of a first frame buffer header from the linked list data structure of FIG. 4A.

FIG. 4B illustrates the format of a first buffer header 412A. Each frame buffer 410 stores a next buffer pointer 426 that addresses the location, in the external memory 36, of the next frame buffer 410 in the linked list 400. The first buffer header 412A uses eight bytes to store required information, and reserves the remaining eight bytes.

As illustrated in FIG. 4B, the first buffer header 412A contains a plurality of fields. The frame length field 416 is fourteen (14) bits long and stores a value corresponding to the total size of the received data frame. The value stored in the frame length field 416 takes into account the destination address of the received data frame and the frame check sequence. A "B" bit 418 (beginning of frame marker) is used to indicate whether the current frame buffer 410 contains the beginning of the received data frame. The "B" bit 418 is set (i.e., assigned a value of "1") to indicate that the current frame buffer 410 is the first frame buffer 410A used to store the received data frame, and cleared (i.e., assigned a value of "0") for all subsequent frame buffers 410B. An "E" Bit 420 (End of Frame Marker) is used to indicate that the current frame buffer 410 is the last frame buffer used to store a received data frame. When the "E" bit 420 is set (i.e., assigned a value of "1"), there are no more frame buffers 410 in the linked list 400.

A "G" bit 422 (good frame) is used to indicate that the current data frame did not experience any receive errors. The "G" bit 422 and the "B" bit 418 are both used for diagnostic purposes. However, the dequeuing logic 74 does not check the value of the "G" bit 422. The buffer length field 424 is eight (8) bits long and stores a value that indicates the number of bytes in the data portion 414 of the current frame buffer 410, beginning with the first byte after the buffer header 412. The next buffer pointer field 426 is thirteen (13) bits long, and stores the value of the address pointer to the subsequent frame buffer 410B in the linked list 400. If the "E" bit 420 is set, however, the next buffer pointer is undefined.

Maintaining Free Buffer Information

Figure 5:
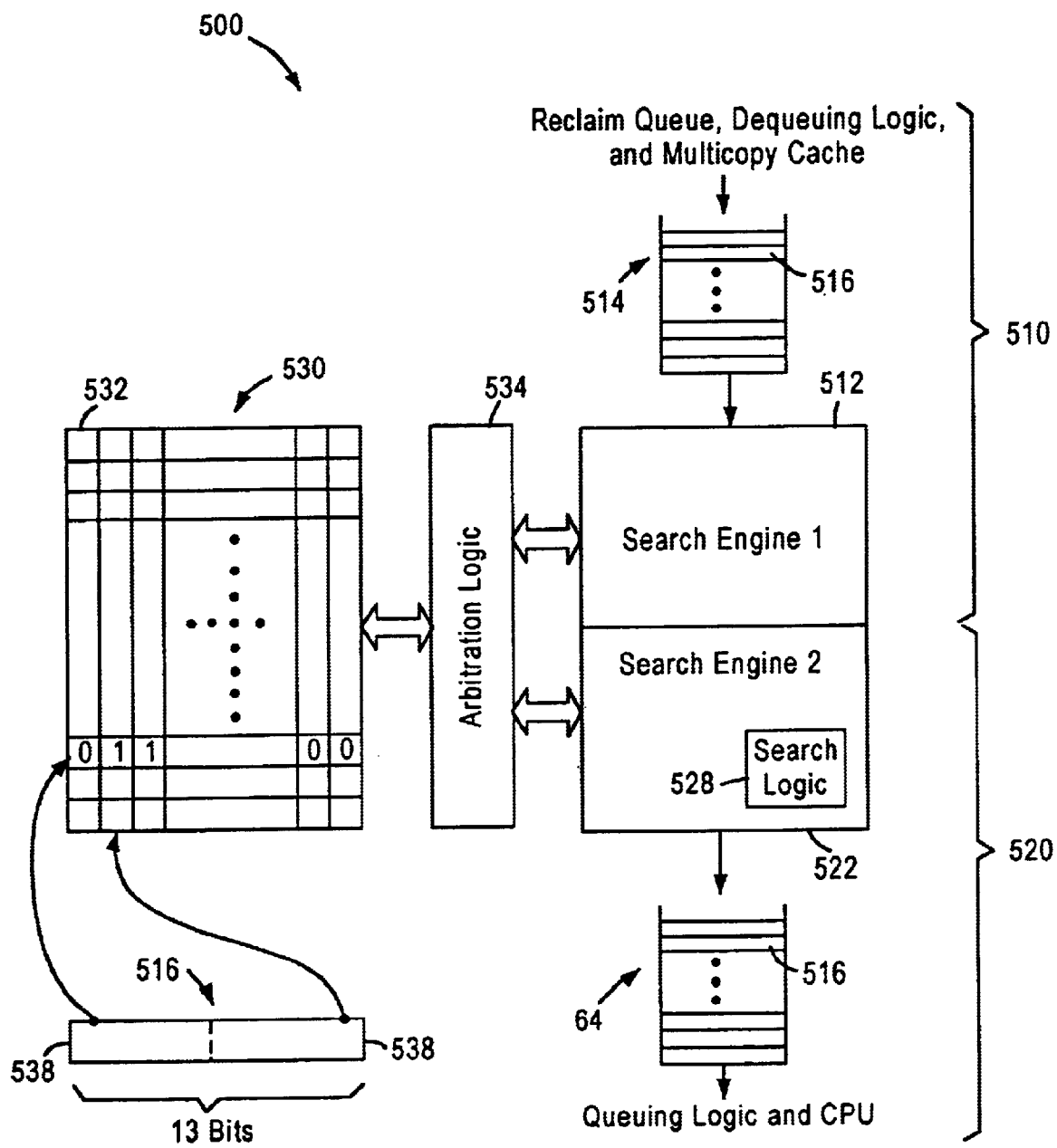
FIG. 5 is a block diagram of an arrangement for maintaining free buffer information according to an exemplary embodiment of the present invention.

FIG. 5 illustrates an arrangement 500 for maintaining randomly accessible free buffer information on the multiport switch 12 (i.e., the chip itself). The arrangement 500 of FIG.

5 includes an input logic 510, an output logic 520, a random access memory area 530, and an arbitration logic 534. The input logic 510 functions to write (or store) values into the RAM area 530. The values stored in the RAM area 530 are pointers that correspond to available free buffers that can be used by the multiport switch 12 to store received data frames.

As illustrated in FIG. 5, the input logic 510 includes a first search engine 512 and an input queue 514. The input queue 514 queues a plurality of entries 516 that correspond to available free buffers in the external memory 36. According to the disclosed embodiment of the invention, the entries 516 input to the input queue 514 are buffer pointers that address the locations of free buffers within the external memory 36. Furthermore, each buffer pointer within the input queue 514 corresponds to a specific free buffer that is located in the external memory 36. The entries 516 input to the input queue 514 are received from various entities of the multiport switch 12 such as, for example, the reclaim queue 66, the dequeuing logic 76, and the multicopy cache 62. As previously indicated, the multiport switch 12 selectively forwards received data frames to one or more of a plurality of output ports.

Prior to forwarding, the data frames are stored in frame buffers located in the external memory 36. A data frame that has been forwarded to the output ports is no longer needed by the multiport switch 12 if it is the last copy or the only copy of the frame to be transmitted. Therefore, the frame buffers used to store the data contents of a frame may be reclaimed and used to store additional incoming data frames. Various components of the multiport switch 12 therefore continually check to ensure that buffers are quickly reclaimed once the data frames that were stored in them are no longer needed by the multiport switch 12. This can be accomplished, for example, by releasing all frame buffers within the linked list of buffers used to store a received data frame and returning the buffer pointers and frame pointers to the input queue 514. The buffers in the external memory 36 addressed by the pointers input to the input queue 514 are then available for use by the multiport switch 12 to store newly received data frames. For purposes of explanation, the entries input to the input queue 514 and the free buffer queue 64 will be collectively referenced as buffer pointers. It should be understood, however, that the frame pointer addresses the location of the first frame buffer 410A (FIG. 4A) in the linked list data structure 400, while the buffer pointers are stored in the header 412 (FIG. 4A, 4B) of the frame buffers in the linked list data structure 400.

The first search engine 512 continually services the input queue 514 to ensure that free buffers are available to store data frames as they are received by the multiport switch 12. The first search engine 512 retrieves entries 516 from the input queue 514 and writes a value into the RAM area 530 to indicate the availability of specific free buffers for storing data frames. As previously stated, each entry 516 corresponds to a buffer pointer. The first search engine 512 decodes the external memory address specified by the buffer pointer into a unique and fixed location within the RAM area 530. The first search engine 512 then writes a value in the decoded location within the RAM area 530 to indicate that a specific free buffer is available for storing data frames.

According to one embodiment of the present invention, the RAM area 530 is bitwise addressable, and includes a total number "n" of entries 532 (i.e., bits) that corresponds to the total number of free buffers available to the multiport switch 12 for storing data frames. Each entry may hold a separate value. Furthermore, each buffer pointer includes at least two portions. For example, the buffer pointers can include a first portion 536 that addresses a specific row within the RAM area 530, and a second portion 538 that addresses a specific column within the RAM area 530. Accordingly, the length of the two portions of the buffer pointer that are used to address the entries 532 within the RAM area 530 is such that they are sufficient to address the total number of free buffers available to the multiport switch 12.

According to the disclosed embodiment of the invention, when the first search engine 512 retrieves a buffer pointer from the input queue 514 and decodes it to a location within the RAM area 530, the first search engine 512 writes a value of 1 into the decoded location (i.e., entry 532) in the RAM area 530. The value of 1 indicates that the free buffer addressable by the buffer pointer that is decodable into the specified location in the RAM area 530 is available for storing received data frames. Once the first search engine 512 has written an appropriate value (i.e., 1) into the decoded location within the RAM area 530, the buffer pointer may be discarded. Hence, the present invention eliminates the additional storage that is required to maintain large quantities of buffer pointers to address available free buffers.

The output logic 520 locates values in the RAM area 530 that indicate available free buffers and generates buffer pointers that can be used by various components of the multiport switch 12 (i.e., the MAC queuing logics 74 and the CPU 32) to address free buffers for storing newly received data frames. Accordingly, the methodology used to decode the buffer pointers into fixed and unique locations within the RAM area 530 are reversible so that the output logic 520 can reconstruct a buffer pointer that is identical to the buffer pointer retrieved by the first search engine 512 from the input queue 514.

As illustrated in FIG. 5, the output logic 520 includes a second search engine 522, the free buffer queue 64, and a search logic 528. The second search engine 522 services the free buffer queue 64 by placing buffer pointers therein for use by the various components of the multiport switch 12. The second search engine 522 does not, however, arbitrarily generate buffer pointers for input to the free buffer queue 64. Rather, the second search engine 522 searches the RAM area 530 and generates buffer pointers based on locations in the RAM area 530 that correspond to free buffer locations in the external memory 36. According to the disclosed embodiment of the invention, the second search engine 522 searches the RAM area 530 to locate entries 532 that store a bit value of 1. The row and column locations of entries 532 in the RAM area 530 that store a value of 1 are then used by the second search engine to encode a buffer pointer that addresses the corresponding free buffer location within the external memory 36. The buffer pointers generated are then placed in the free buffer queue 64 for use by the components of the multiport switch 12.

The search logic 528 functions to optimize the search path followed by the second search engine 522. For example, the second search engine 522 can typically be configured to perform various types of searches of the RAM area 530, such as serial, parallel, or a combination of both types of searches. Parallel searches are generally faster and more efficient than serial searches, but require more complex logic to perform parallel comparisons of each bit within a word in the RAM area 530. Serial searches are slower than parallel searches, however, serial searches require less complex logic than is generally required to perform parallel searches. The type of search performed by the second search engine 522 must therefore be selected based on a balance between the benefits of each type of search and the requirements of the particular network system.

As previously stated, for example, parallel searches require more complicated logic. This logic is normally embodied directly on the chip that makes up the multiport switch 12. Depending on the total number of free buffers available, specialized RAM areas 530 may also be required to accommodate parallel searches. Therefore, if real estate on the chip (i.e., the multiport switch 12) is at a premium, the addition of logic for performing parallel searches may not be cost effective. Serial searches, although more time consuming, require less logic and can be easily performed on most standard size RAM areas 530. Accordingly, in situations where real estate on the chip is at a premium, logic for performing serial searches may be advantageous. In addition, the second search engine 522 may incorporate a combination of logic for performing both serial and parallel searches based on system requirements in order to optimize speed and real estate for a particular network configuration. Such requirements can be based on, for example, the maximum number of clock cycles that a component is allowed to wait for a buffer pointer, or the frequency with which buffer pointers are requested by the components of the multiport switch 12.

The order in which buffer pointers are generated and placed in the free buffer queue 64 is not important. Therefore, for purposes of storing a received data frame, the first entry 532 in the RAM area 530 can be identified as containing a free buffer indication is equivalent to another free buffer that is identifiable by any other entry 532 within the RAM area 530. The second search engine 522 searches the RAM area 530 to locate values corresponding to available free buffers. According to one embodiment of the present invention, the second search engine 522 will only search the entire RAM area 530 when most of the free buffers are currently being used by the multiport switch 12. Rather, as soon as the second search engine 522 locates a value corresponding to a free buffer, a buffer pointer is immediately generated and placed in the free buffer queue 64. The value of the entry 532 is reset to "0", to indicate that the buffer pointer is no longer free. If additional buffers are required to store data, then the very next location identified by the second search engine 522 will be used to generate buffer pointers for placement in the free buffer queue.

The frequency with which the second search engine 522 services the free buffer queue 64 may be determined based on various conditions. For example, the free buffer queue 64 may be configured to store a prescribed number of entries 516. The number of entries 516 may be selected based on the number of ports, or components, of the multiport switch 12 that are configured to retrieve buffer pointers from the free buffer queue 64. According to such an embodiment, one available buffer pointer can be allowed for each component of the multiport switch 12, although other embodiments may allow 2 or more buffer pointers for each component of the multiport switch 12. The second search engine 522 can be configured to search the RAM 530 and queue a new buffer pointer into the free buffer queue 64 whenever a buffer pointer is retrieved from the free buffer queue. Alternatively, in systems that allow multiple buffer pointers for each component of the multiport switch 12, a threshold value can be used. As buffer pointers are retrieved by components of the multiport switch 12, the second search engine 522 monitors the number of entries that remain within the free buffer queue 64. When the number of entries in the free buffer queue 64 falls below the threshold value, the second search engine 522 searches the RAM area 530 and generates buffer pointers until the free buffer queue 64 is full or reaches a prescribed level. Such an embodiment can also utilize a programmable threshold that can be dynamically adjusted during operation.

Under normal conditions, it is possible that the second search engine 522 can generate a plurality of buffer pointers from a block of sequential entries 532 within the RAM area 530. When additional buffer pointers are required, however, the second search engine 522 may needlessly search the entire block of entries in order to locate available free buffer locations. In particular, if the buffer pointers were recently generated from the locations in the block of sequential entries, the second search engine 522 will not locate available free buffers until the entire block has been searched. According to one embodiment of the present invention, the search logic 528 is configured to control the search path followed by the second search engine 522. Preferably, a random search path is generated each time the second search engine 522 searches the RAM area 530. Such an embodiment can advantageously reduce the size of blocks of entries used to generate buffer pointers, as well as minimize the possibility of needlessly searching through a section of the RAM area 530 containing a recently generated block of buffer pointers.

Under normal operating conditions, it is possible that the first search engine 512 and the second search engine 522 will simultaneously require access to the RAM area 530, or even the same entry 532 within the RAM area 530. However, simultaneous access of the same entry 532 by the first and second search engines 512, 522, will normally result in an error. Furthermore, access to the same word within the RAM area 530 can sometimes result in an error. According to the disclosed embodiment of the present invention, the arbitration logic 534 functions to control access to the RAM area 530 by the first and second search engines 512, 522. The arbitration logic 534 can be configured to operate in numerous ways. For example, the arbitration logic 534 can be configured to utilize a single bit (i.e., a control bit) to control access to the RAM area 530. When either the first search engine 512 or the second search engine 522 requires access to the RAM area 530, the arbitration logic 534 checks the status of the control bit. If the control bit is not set, then the requesting search engine can access the RAM area 530. Assume that the first search engine 512 requires access to the RAM area 530. As soon as the first search engine 512 begins accessing the RAM area 530, the arbitration logic 534 sets the control bit to indicate that the RAM area 530 is currently being accessed. If the second search engine 522 requires access to the RAM area 530, then the arbitration logic 534 will check the status of the control bit. Since the RAM area 530 is already being accessed by the first search engine 512, the arbitration logic 534 will deny access to the RAM area 530 by the second search engine 522. When the first search engine 512 has concluded its transaction with the RAM area 530, the arbitration logic 534 will reset the value of the control bit. Hence, the second search engine 522 can now access the RAM area 530.

Various other configurations may also be used to control access to the RAM area 530. For example, the arbitration logic 534 may include circuitry to provide access to different words within the RAM area 530 by the first and second search engines 512, 522. Such an embodiment has an advantage of minimizing idle time by one of the search engines while the other search engine accesses the RAM area 530. In addition, dual port RAM configurations may be used to provide simultaneous access to the RAM area 530 by both the first search engine 512 and the second search engine 522. The type of arbitration system used will therefore depend on the specific implementation of the multiport switch 12.

Figure 6:
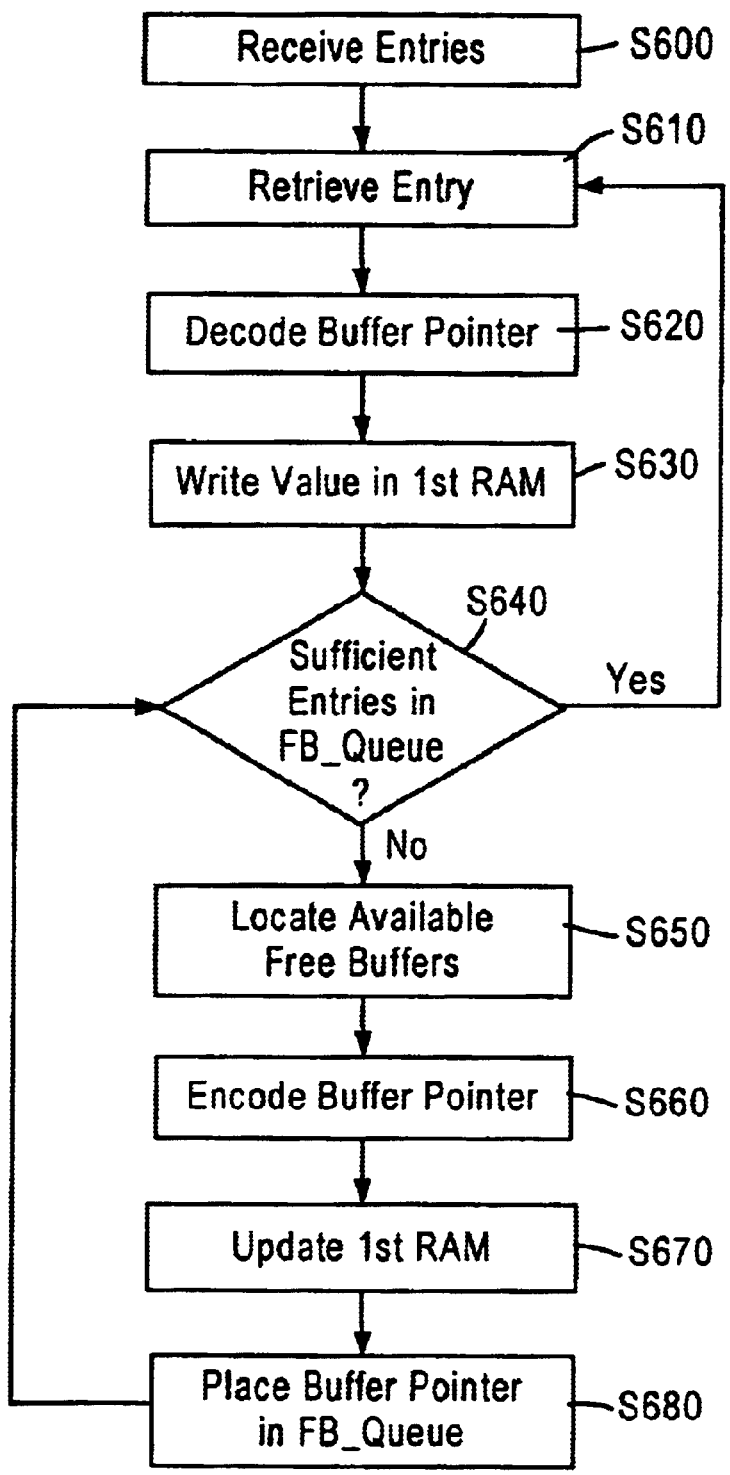
FIG. 6 is a flow chart illustrating the steps performed in maintaining free buffer information according to an exemplary embodiment of the present invention.

FIG. 6 is a flow chart illustrating the steps performed in maintaining free buffer information for the multiport switch 12 according to an exemplary embodiment of the invention. At step S600, the multiport switch 12 is initialized and entries are received at the input queue 514. At step S610, the first search engine 512 services the input queue 514 by retrieving an entry 516 therefrom. As previously stated, the entries 516 in the input queue 514 correspond to buffer pointers that address the locations of available free buffers within the external memory 36. At step S620, the first search engine 512 decodes the buffer pointer retrieved from the input queue 514 into a unique and fixed location within the RAM area 530. At step S630, the first search engine 512 writes a value (i.e., 1) into the decoded location within the RAM area 530 in order to indicate that the corresponding free buffer is available for storing received data frames. In order to access the RAM area 530 and write a value therein, it may be necessary for the first search engine 512 to request access to the RAM area 530 via the arbitration logic 534.

As previously stated, various embodiments of the present invention may incorporate a threshold value that determines the frequency with which the second search engine will service the free buffer queue 64. At step S640, the second search engine determines if there are sufficient entries 516 within the free buffer queue 64. For example, if the number of entries 516 currently stored within the free buffer queue 64 is greater than the threshold value then there are sufficient entries within the free buffer queue 64. Alternatively, if the number of entries 516 is less than the threshold value, then there is an insufficient number of entries 516 within the free buffer queue 64. If a threshold value is not used, then the second search engine 522 simply determines if the free buffer queue 64 is full. If the free buffer queue 64 is full, then there is a sufficient number of entries 516. If any entries 516 have been retrieved from the free buffer queue 64, then the second search engine 522 will detect that an insufficient number of entries 516 remain therein.

If there is a sufficient number of entries 516 within the free buffer queue 64, then control returns to step S610 where additional entries 516 are serviced from the input queue 514. It should be understood, however, that the first search engine 512 continually services the input queue 514, and does not wait until the second search engine 522 determines that there is a sufficient number of entries 516 in the free buffer queue 64. If it is determined, at step S640, that there is an insufficient number of entries 516 within the free buffer queue 64, then at step S650, the second search engine 522 will proceed to locate available free buffers. As previously stated, this is accomplished by searching the RAM area 530 in order to locate values that indicate available free buffer locations in the external memory 36. In addition, various search techniques (i.e., parallel, serial, or both) may be utilized by the second search engine 522 to locate the values within the RAM area 530. Furthermore, it may be necessary for the second search engine 522 to obtain access to the RAM area 530 by placing a request to the arbitration logic 534.

At step S660, the second search engine 522 encodes buffer pointers based on the location of values detected during its search of the RAM area 530. When the second search engine 522 locates a value corresponding to a free buffer, it encodes a buffer pointer and resets the bit to 0 to indicate that the particular free buffer is not available for use. This is indicated at step S670 where the second search engine 522 updates the values in the RAM area 530. At step S680, the second search engine 522 places the encoded buffer pointers into the free buffer queue 64. The buffer pointers stored in the free buffer queue 64 can then be accessed by the various components of the multiport switch 12 in order to locate free buffers for storing received data frames. The second search engine 522 will continue servicing the free buffer queue 64 in order to ensure that buffer pointers are readily available for use. This is indicated by a return to step S640, where the second search engine 522 will continue to check if there are sufficient entries in the free buffer queue 64.

The present arrangement advantageously reduces the amount of storage space required to store buffer pointers by utilizing a RAM that stores only an indication of whether free buffers are available for use. Buffer pointers are then created only when necessary to address buffers for storing data frames. For example, buffer pointers are normally stored in a queue that is maintained on the network switch. However, each buffer pointer can be several bytes in length. Consider a system not designed according to the present invention, which includes a static number of buffers such as 1024, and buffer pointers that are 2 bytes (i.e., 16 bits) in length. Since each buffer must be addressable by a buffer pointer, a total of 1024 buffer pointers are required. However, each buffer pointer requires 2 bytes of storage space, for a total of 2048 bytes, or 16,384 bits. The storage space is further increased in order to allow for the additional storage requirements for implementing the queue structure itself. To accommodate the total number of buffer pointers required, the queue structure may be implemented to include an overflow portion that is located in external memory.

According to the present invention, however, the total amount of space required to access the buffers is significantly reduced so that all of the information can be maintained on the network switch. For example, the present invention does not require 2048 bytes of storage for buffer pointers necessary to address 1024 buffers. Instead, only 128 bytes (i.e., 1024 bits) of storage are required to maintain information regarding the same amount (1024) of free buffers. The buffer pointers are then generated from the stored information based on the value and location of individual bits. In order to increase the availability of buffer pointers, a queue of minimal capacity such as, for example, 4 entries can be provided to store some of the buffer pointers. In such an arrangement, only 136 bytes of storage would be necessary.

One advantage of the present invention is the ability to increase access to buffer pointers by maintaining information regarding free buffers entirely on the network chip. Since access to the external memory is normally much slower than access to on-chip memory, overall performance of the multiport switch is increased. Furthermore, the need to incorporate complex logic to provide access to the external memory is eliminated.

Another advantage of the present invention is the increased bandwidth that results from maintaining the free buffer information entirely on the network chip. For example, during normal operation of the multiport switch, various components must access the external memory. However, each component must wait until it is granted permission before it can access the external memory. By maintaining free buffer information on the switch, the shared bandwidth that must be used to access the external memory is improved.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. An arrangement for maintaining free buffer information for a network switch that receives and forwards data frames to plural ports, the arrangement comprising:

a first random access memory (RAM) located on the network switch for storing values that indicate the availability of free buffers for storing received data frames in a second RAM, said values being different from buffer pointers;

an input logic for placing values, in said first RAM, that indicate which of said free buffers are available for storing received data frames; and an output logic for searching said first RAM to locate values that indicate available free buffers in said second RAM, and generating buffer pointers that address the locations of said free buffers in said second RAM.

2. The arrangement of claim 1, further comprising an arbitration logic for preventing simultaneous access of the same location in said first RAM by both said input logic and said output logic.

3. The arrangement of claim 1, wherein:

each buffer pointer includes at least two portions;

a first portion of said buffer pointer forming an address of a row in said first RAM; and a second portion of said buffer pointer forming an address of a column in said first RAM.

4. The arrangement of claim 1, wherein said first RAM includes a dual-port arrangement that provides simultaneous access to both said input logic and said output logic.

5. The arrangement of claim 1, wherein said input logic includes:

an input queue for queuing entries corresponding to available free buffers that are no longer being used by the network switch to store received data frames; and a first search engine for retrieving entries from said input queue and storing said values in said first RAM, based on said retrieved entries;

wherein each value corresponds to one of said retrieved entries.

6. The arrangement of claim 5, wherein:

said input queue is configured to queue buffer pointers received from various components of the network switch, said buffer pointers addressing the locations of said free buffers in said second RAM; and said first search engine is configured to decode each buffer pointer retrieved from said first input queue into a unique fixed location within said first RAM, and store a value, in said first RAM, indicating that a particular free buffer addressed by a particular retrieved buffer pointer is available for storing received data frames.

7. The arrangement of claim 1, wherein said output logic includes:

a second search engine for searching said first RAM to locate values that indicate available free buffers in said second RAM, and generating buffer pointers that address the locations of said free buffers; and a free buffer queue for queuing buffer pointers generated by said second search engine.

8. The arrangement of claim 7, wherein said free buffer queue has a capacity for storing a prescribed number of buffer pointers corresponding to the number of ports available in the network switch.

9. The arrangement of claim 7, wherein said output logic further comprises a search logic for randomizing the search path followed by said second search engine each time a search of said first RAM is performed.

10. The arrangement of claim 1, wherein said first RAM is a prescribed size corresponding to the total number of free buffers available for storing received data frames.

11. The arrangement of claim 10, wherein said prescribed size is a number of bits that are equal to the total number of free buffers available to the network switch for storing received data frames.

12. The arrangement of claim 11, wherein said first RAM is bitwise addressable, and wherein setting a particular bit to a value of 1 indicates that a corresponding free buffer is available for use and resetting said particular bit to a value of 0 indicates that said corresponding free buffer is not available for use.

13. A method of maintaining free buffer information for a network switch comprising the steps:

placing values, in a first random access memory (RAM) located on the network switch, that indicate the availability of free buffers located in a second RAM, the free buffers being usable by the network switch to store received data frames;

searching the first RAM to locate values that indicate available free buffers in the second RAM, said values being different from buffer pointers; and generating buffer pointers that address the locations of the free buffers in the second RAM, the buffer pointers being available for use by the network switch to locate free buffers for storing received data frames.

14. The method of claim 13, wherein the step of placing values comprises the steps:

queuing entries into an input queue that stores entries corresponding to available free buffers that are no longer being used by the network switch to store received data frames; and placing the values in the first RAM based on entries retrieved from the input queue.

15. The method of claim 13, wherein an input logic performs the step of placing values, and an output logic performs the steps of searching the first RAM and generating buffer pointers, and further comprising a step of arbitrating access to the first RAM by the input logic and the output logic.

16. The method of claim 13, further comprising a step of queuing the generated buffer pointers into a free buffer queue that stores buffer pointers that are available for use by various components of the network switch to store received data frames.

17. The method of claim 13, wherein the step of searching the first RAM comprises the step of searching the first RAM to locate values that indicate available free buffers in the second RAM in a random search pattern each time values need to be located.

18. The method of claim 13, wherein the first RAM is bitwise addressable and the step of placing values includes a step of setting a particular bit to one of a value of 1 and a value of 0, whereby a value of 1 indicates that a corresponding free buffer is available for use and a value of 0 indicates that the corresponding free buffer is not available for use.

19. The method of claim 13, wherein the step of placing values comprises the steps:

queuing entries into an input queue that stores buffer pointers that address the locations of free buffers in the second RAM;

decoding each buffer pointer retrieved from the input queue into a unique fixed location within the first RAM; and storing a value, in the first RAM, indicating that a particular free buffer addressed by a particular retrieved buffer pointer is available for storing received data frames.

20. The method of claim 19, wherein each buffer pointer includes at least two portions, and the step of decoding each buffer pointer includes the steps:

decoding a first portion of the buffer pointer into a corresponding row location within the first RAM; and decoding a second portion of the buffer pointer into a corresponding column location within the second RAM.

* * * * *